United States Patent [19]

Hodges

[11] Patent Number: 4,708,320

[45] Date of Patent: * Nov. 24, 1987

[54] SELF ADJUSTING BELT TIGHTENING TOOL

[76] Inventor: Virgil D. Hodges, 7211 Oak Village, Humble, Tex. 77038

[ * ] Notice: The portion of the term of this patent subsequent to Jan. 24, 2003 has been disclaimed.

[21] Appl. No.: 488,425

[22] Filed: Apr. 25, 1983

[51] Int. Cl.⁴ .............................................. B66F 15/00
[52] U.S. Cl. ..................................... 254/129; 254/131
[58] Field of Search ................. 254/131, 129, 120, 44; 29/267

[56] References Cited

U.S. PATENT DOCUMENTS

| 658,613 | 9/1900 | Beronio | 254/131 X |
|---|---|---|---|
| 1,666,592 | 4/1928 | Brennan . | |
| 1,895,030 | 1/1933 | Elmore | 254/44 |
| 2,629,584 | 2/1953 | Cannon | 254/120 |
| 2,995,340 | 8/1961 | Richardson | 29/267 X |
| 4,244,559 | 1/1981 | Mote | 254/129 |
| 4,380,326 | 4/1983 | Marzorati | 254/131 |

FOREIGN PATENT DOCUMENTS 1812824  8/1969  Fed. Rep. of Germany ...... 254/131

Primary Examiner—Frederick R. Schmidt
Assistant Examiner—Steven P. Schad
Attorney, Agent, or Firm—Robert J. Marett

[57] ABSTRACT

A self adjusting belt tightening tool for use in adjusting belts on various belt driven automotive components and other related applicatons. The self adjusting belt tightening tool comprises a shaft having a handle on one end and a foot on the other end. A freely swinging grap bar is pivotally mounted on the shaft having an adjustable toe on its end. The toe is adjustable to various positions by means of a removable pin.

1 Claim, 5 Drawing Figures

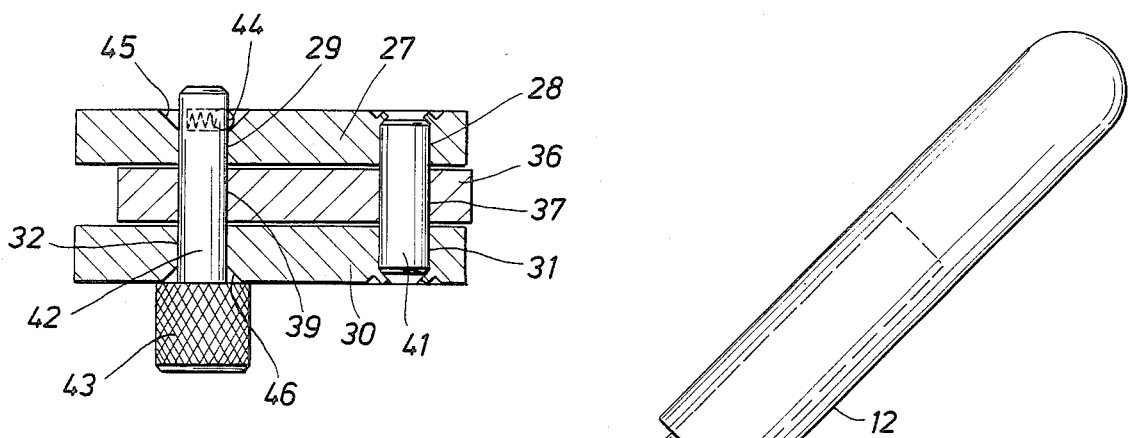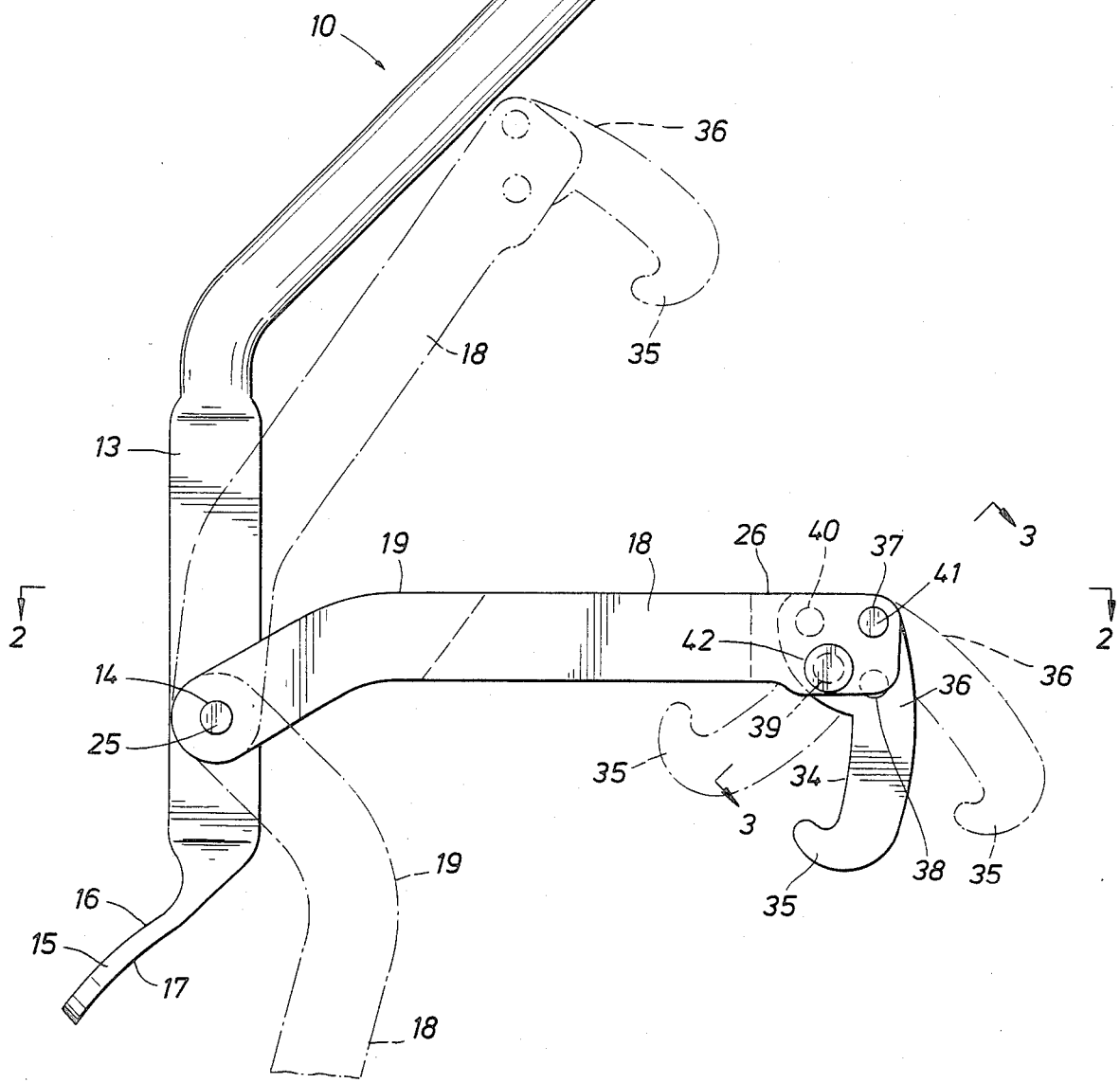

SELF ADJUSTING BELT TIGHTENING TOOL

BACKGRONUD OF THE INVENTION

1. Field of the Invention

The invention relates to hand tools and more particularly to a hand tood to be used in adjusting endless drive belts which are connected to various automobile engine components.

2. Brief Description of the Prior Art

The two most common tools used today to adjust belts on automobile engines are the crow bar and/or the long screw drive. A bolt is loosened on some support bracket on a generator for example, the crow bar is placed against the generator to be adjusted and a prying force is exerted on the component to tighten the belt. To accomplishes this prying effect, the end of the crow bar is pushing against some other part of the engine. The problem with adjusting belts in this manner is that other engine components are sometimes damaged due to the prying action of the end of the crow bar. Valve covers, heater hoses, electrical lines and other engine components are all usually in close proximity to the generator to be adjusted. A mechanic has to be careful not to pry against any of these components to avoid damaging them. The cause for a leak in a valve cover or in a power steering pump can many times be directly traced to a mechanic prying against the valve cover or the pump in trying to adjust a generator, alternator, power steering or air conditioner compressor belt.

Attempts are in the prior art which try to overcome this problem. U.S. Pat. No. 2,629,584 to Cannon discloses a generator lifting tool adapted to lift a generator to tighten its driving belt.

U.S. Pat. No. 4,244,559 to Mote discloses a belt tightening tool adapted to be placed on a component directly. The Mote belt tightening tool includes a jaw element of fixed length having a concave inner surface adapted to fit around the periphery of the component to be adjusted, and an adjustable lever arm to apply leverage, connected to the fixed length jaw element by a nut and bolt subassembly.

3. Brief Description of the Present Invention

It would be advantageous for a mechanic to have a tool available which would simply grab any size component to be adjusted and apply torque on the component itself without having to pry against other engine components and also be self adjusting so as to fit any diameter component without having to disassemble and reassemble and subassemblies.

The self adjusting belt tightening tool described herein comprises a shaft having a handle on one end and a prying foot on the other end. A grab bar is pinned on the shaft in such a manner that it can swing freely. An adjustable tooth member is pivotally mounted on the end of the grab bar. In operation, the prying foot is placed on the periphery of the component to be moved and the adjustable tooth member is placed behind some part of the component. The handle is pulled in the direction of the foot creating a torque on the component and causing it to pivot around some pivot bolt thus tightening any belt on the component.

An important object of this invention is to provide a new and improved belt tightening tool that a mechanic can place directly on the component to be adjusted without having to pry against adjacent components.

Since generators, alternators, power steering pumps, air conditioner compressors, and other bet driven component parts come in different sizes and shapes, it is a further object of this invention to provide a belt tightening tool which is self adjusting to any diameter component.

Other objects an advantages of this invention will become apparent from the following description taken in connection with the accompanying drawings wherein are set forth by way of illustration and example, certain embodiments of this invention.

BRIEF DESCRIPTION OF THE DRAWINGS

FIG. 1 is a detail in plan view of the self adjusting belt tightening tool according to the present invention.

FIG. 3 is a cross sectional detail view taken along line 3—3 in FIG. 1.

DESCRIPTION OF THE PREFERRED EMBODIMENT

Figure 2:
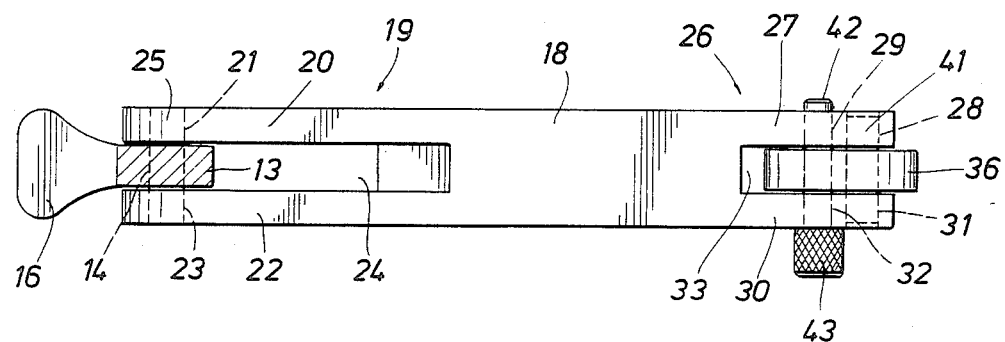
FIG. 2 is a cross sectional detaial view taken along line 2—2 in FIG. 1.

Referring now to FIGS. 1, 2 and 3 collectively, the self adjusting belt tightening tool is illustrated generally as reference numeral 10, comprising a shaft 11 having a handle 12 on one end, a mid-section 13 having a pivot hole 14 therein and a foot 15 on the other end. Foot 15 is constructed having a convex upper surface 16 and a concave lower surface 17 so that the concave lower surface 17 of foot 15 will fit the outer periphery of the component to be adjusted.

A grab bar 18 having a first forked end 19 and a second forked end 26 is pivotally mounted on the midsection 13 of said shaft 11 as described below. The first forked end 19 comprises two substantially parallel members 20 and 22 each having a bore 21 and 23 contained therein and aligned with each other to receive a stationary pivot pin 25. Midsection 13 of the shaft 11 is positioned between the substantially parallel members 20 and 22 so that the pivot hole 14 aligns with the bores 21 and 23. Pivot pin 25 is rigidly positioned through bores 21 of member 20, through the pivot hole 14 of the midsection 13, and throuh bore 23 of the member 22 to enable the grab bar 18 to swing freely in the open slot 24 and to pivot abou the pivot pin 25.

On the second forked end 26 of the grab bar 18 are two substantially parallel members 27 and 30. The first parallel member 27 has two bores 28 and 29 contained therein which align with corresponding bores 31 and 32 contained in the second parallel member 30. A second open slot 33 is formed between the first and second parallel members 27 and 30 in order to receive a toe member 34. Toe member 34 has a hooked end 35 with the other end 36 having a second pivot hole 37 and a plurality of bores 38, 39 and 40 contained therein. Toe member 34 is positioned between the first and second parallel members 27 and 30 so that the second pivot hole 37 aligns with bores 28 and 31 in the parallel members.

A second pivot pin 41 is rigidly positioned through the bore 28 of the first parallel member 27, through the second pivot hole 37 of the other end 36 of toe member 34, and through bore 31 in the second parallel member 30 to enable the toe member 34 to swing freely within the second open slot 33 about second pivot pin 41.

To prevent the rotation of the toe member 34 about the second pivot pin 41, a removable pin 42, having a knurled head 43, is inserted into either bore 32 or bore 29 of the respective parallel member passing through one of the plurality of bores 38, 39 or 40 in the other end 36 of the toe member 34. The removable pin 42 is held in position by a ball and spring arrangement 44 mounted in the shaft of the removable pin 42. Bore 29 in the first parallel member 27 has an inclined depression 45 on the surface thereof. Bore 32 in the second parallel member has a second inclined depression 46 on the surface thereof. The inclined depressions 45 and 46 permit easy insertion of the removable pin 42 and allows the ball and spring arrangement 44 to snap out of the shaft of the removable pin 42 and held in position by friction.

Figure 4:
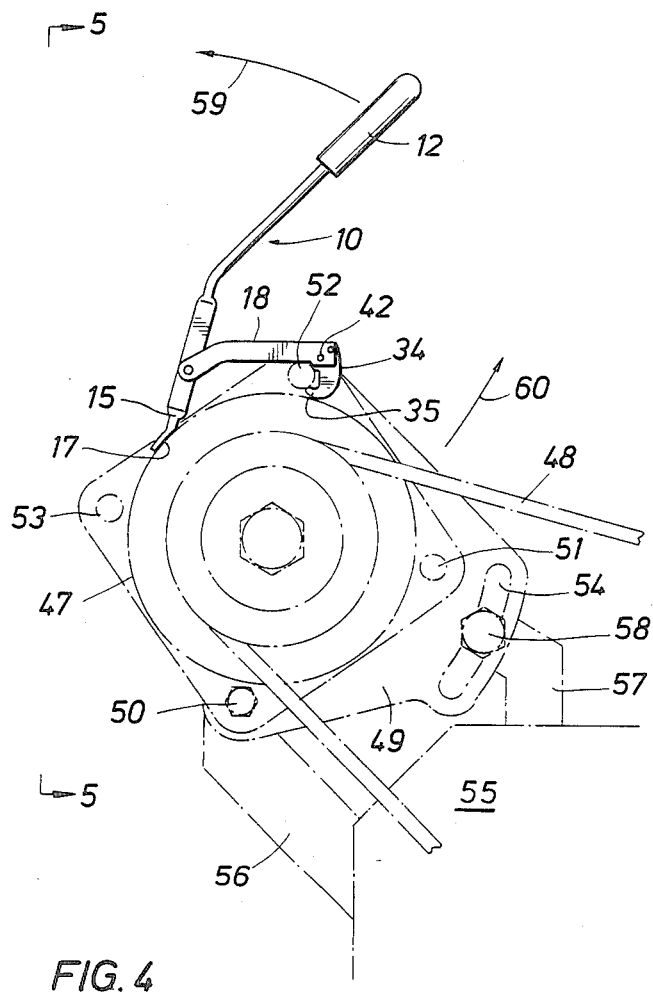
FIG. 4 is a front elevation view of the present invention placed in postion on an automotive belt driven component showing the manner in which the tool is used to tighten a belt.
Figure 5:
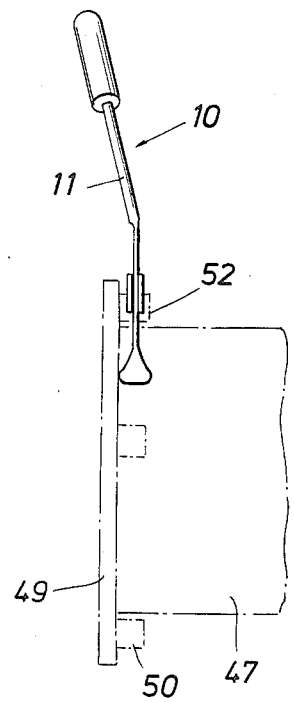
FIG. 5 is a partial detail taken along line 5—5 in FIG. 4 showing how the shaft is at an angle off the vertical.

FIGS. 4 and 5 illustrate the operation of the self adjusting belt tightening tool. An engine component 47, such as a generator for example, is driven by a belt 48 by the use of a pully mounted on the generator as shown. Generator 47 is mounted on a mounting bracket 49 by a plurality of bolts 50, 51, 52 and 53 in such a manner that the generator 47 and the mounting bracket 49 will pivot around bolt 50. An elongated slot 54 is provided in the mounting bracket 49. The engine, shown in partial view as reference numeral 55, has a support bracket 56 attached thereto and further attached to the generator mounting bracket 49 by bolt 50. An adjusting bracket 57 is rigidly attached to the engine block 55 and has an adjusting bolt 58 on its end which extends through the elongated slot 54 in the mounting bracket 49.

To tighten the belt 48, the adjusting bolt 58 is loosened to allow the generator 47 and the mounting bracket 49 to pivot about pivot bolt 50. The lower concave surface 17 of the foot 15 of the self adjusting belt tightening tool 10 is placed on the periphery of the generator 47. The grab bar 18 is swung out to allow the hooked end 35 of the toe member 34 to be placed behind any convenient shoulder or bolt, bolt 52 as illustrated, on the generator 47 or on the mounting bracket 49. If more reach is needed, the removable pin 42 is taken out allowing the toe member 34 to be extended as shown in FIG. 1 and the pin reinserted through any one of the plurality of bores 38, 39 or 40. A force is exerted on the handle 12 in the direction of arrows 59 causing the generator to move counterclockwise as shown by the arrow 60 with adjusting bolt 58 moving within the elongated slot 54. When sufficient tension is obtained for the belt, the ajusting bolt 58 is tightened thus preventing the generator 47 from rotating clockwise and loosening the belt.

Some belt driven engine components are located within restricted and confined areas under the hood of an automobile such as close to the fender well. It has been discovered through experience that if the shaft 11 is angled from the vertical as shown in FIG. 5, the maneuverability of the tool in these confined and restricted areas is greatly increased.

From the foregoing description of a preferred embodiment of the invention, it can be seen that the self adjusting belt tightening tool of the invention is simple in its construction and operation. It will allow any mechanic to quickly tighten any belt without the use of a helper and without damaging any adjacent engine components. The use of the freely swinging grab bar 18 and the adjustable toe member 34 will allow the tool to self adjust and grab practically any size diameter component. Although a preferred embodiment of the invention has been herein described in order to illustrate the operating principles of the invention, it will be understood that various changes and modifications in the illustrated embodiment can be effected without departure from the basic principles which underlie the invention. Changes and innovations of this type are therefore deemed to be circumscribed by the spirit and scope of the invention, except as the same may be necessarily limited by the appended claims or reasonable equivalents thereof.

I claim:

1. A self adjusting belt tightening tool comprising:
   a rigid shaft having a first end and a second end wherein said second end defines a foot, rigidly attached to said shaft, having a convex upper surface and a concave lower surface;
   a grab bar having a first forked end and a second forked end with said first forked end pivotly mounted onto said shaft so positioned so that said second forked end pivots toward the concave lower surface of said foot and further with said second forked end having a plurality of bores therein;
   a toe member having a hook on one end with the other end having a plurality of bores greater than the number provided in the grab bar, with said other end positioned within said second forked end of grab bar;
   a stationary pivot pin positioned through one of said other end of said toe member;
   a removable pivot pin positioned through another of said plurality of bores of said second forked end of said grab bar and also selectively positioned through another of said plurality of bores of said other end of said toe member so as to adjustably position said toe member in a fixed relation with respect to said grab bar.

* * * * *